(12) United States Patent
Pengiel (10) Patent No.: US 11,061,914 B2
(45) Date of Patent: Jul. 13, 2021

(54) SYSTEM AND METHOD TO RETRIEVE RELEVANT ITEMS AND ASSIGN RELEVANCY SCORE TO THE RELEVANT ITEMS

(71) Applicant: Gregory Pengiel, Woodridge, IL (US)

(72) Inventor: Gregory Pengiel, Woodridge, IL (US)

( * ) Notice: Subject to any disclaimer, the term of this patent is extended or adjusted under 35 U.S.C. 154(b) by 0 days.

(21) Appl. No.: 16/683,833

(22) Filed: Nov. 14, 2019

(65) Prior Publication Data

US 2020/0159739 A1    May 21, 2020

Related U.S. Application Data

(60) Provisional application No. 62/768,762, filed on Nov. 16, 2018.

(51) Int. Cl.
*G06F 16/2457* (2019.01)
*G06F 16/9535* (2019.01)

(52) U.S. Cl.
CPC .... *G06F 16/24578* (2019.01); *G06F 16/9535* (2019.01)

(58) Field of Classification Search
CPC .............. G06F 16/9535; G06F 16/953; G06F 16/24578

USPC ........................................................ 707/727
See application file for complete search history.

(56) References Cited

U.S. PATENT DOCUMENTS

| | | | |
|---|---|---|---|
| 9,928,299 B2 * | 3/2018 | Musgrove | G06F 16/35 |
| 10,459,989 B1 * | 10/2019 | Haahr | G06F 16/313 |
| 2007/0288433 A1 * | 12/2007 | Gupta | G06F 16/24578 |
| 2009/0282023 A1 * | 11/2009 | Bennett | G06F 16/3326 |

* cited by examiner

*Primary Examiner* — Kuen S Lu
(74) *Attorney, Agent, or Firm* — Law Office of Scott C Harris, Inc (57) ABSTRACT

Matching a search request and data to retrieve relevant items from the data, and further assigning a relevancy score to the relevant items. A search request is received from a user and the search request is matched against the data stored in repositories. The matching module utilizes instructions to retrieve the relevant items. A relevancy score is computed and assigned to the relevant items by utilizing a plurality of mechanisms. The plurality of mechanisms performs a step of retrieving the data based on the relevancy score and performing a search after each word is typed in an entry field by the user to provide relevant items with the highest relevancy score. Then the mechanism performs a search across the repositories on detecting the search request entered in the entry field to display matched items based on configured rules used by a relevance algorithm.

15 Claims, 5 Drawing Sheets

SYSTEM AND METHOD TO RETRIEVE RELEVANT ITEMS AND ASSIGN RELEVANCY SCORE TO THE RELEVANT ITEMS

This application claims priority from Provisional application No. 62/768,762, filed Nov. 16, 2018, the entire contents of which is herewith incorporated by reference.

TECHNICAL FIELD

The present invention relates to data retrieval, in particular to a system and method for matching a search request and data to retrieve one or more relevant items from the data, and further assigning a relevancy score to the relevant items.

BACKGROUND

Typically, search engines are used to retrieve the most relevant or close results for the user's search requests which are submitted in the form of a search string or search query. Further, the search engines return similar documents to a reference document provided by the user.

Traditionally, search engines depend on two basic methods: a keyword matching method and a PageRank method. The keyword matching method is based on the information collected from inside the documents (content of the documents), and various analytics applied to analyze the content of the document. On the other hand, the PageRank method is based on counting the references (links) to each document across the Internet (like citation count which is common in the evaluation of the importance of essays in the academic world). In case a user wants to retrieve data related to any specific domain or department, the user has to visit various search engines or department websites to retrieve the data.

The existing methods require the user to manually perform the search throughout all different repositories resulting in extra work, missed documents, and high inefficiencies.

Additionally, the existing system and methods are redundant because they did not consider the previous searches and historical data to retrieve the required results. Eventually, some systems provide a static lookup ability. Further, the existing systems would let the administrator specify a keyword and a link to the associated data. Furthermore, the existing search engines are limited and only pointed to one or specific data source.

Thus, in view of the above, there is a long-felt need in the industry to address the aforementioned deficiencies and inadequacies.

Further limitations and disadvantages of conventional and traditional approaches will become apparent to one of skill in the art through comparison of described systems with some aspects of the present disclosure, as set forth in the remainder of the present application and with reference to the drawings.

SUMMARY OF THE INVENTION

The present invention addresses the technical problems existing in the prior art. In response to these problems, the present invention provides a system and method for matching a search request and data to retrieve one or more relevant items from the data, and further assigning a relevancy score to the relevant items.

The inventor recognized that there is a need for an efficient, elegant and effective system and method for matching a search request and data to retrieve relevant items from the data. Further, there is a need for a system and method for assigning a relevancy score to the relevant items. Furthermore, there is a need for a system and method to provide an integrated platform to automatically produce matching information such as documents, files, etc.

An aspect of the present disclosure relates to a method for matching a search request and data to retrieve one or more relevant items from the data, and further assigning a relevancy score to the relevant items. The method includes a step of receiving at least one search request from a user and matching the search request against the data stored in a plurality of repositories. The matching module utilizes a plurality of instructions to retrieve the relevant items. The method includes a step of computing and assigning a relevancy score to the relevant items by utilizing a plurality of mechanisms. The plurality of mechanisms perform a step of retrieving the data based on the relevancy score and performing a search after each word is typed in an entry field by the user to provide one or more relevant items with highest relevancy score through an inline deflection module. Then the mechanism performs a search across the repositories on detecting the search request entered in the entry field to display a plurality of matched items based on a plurality of configured rules used by a relevance algorithm configured with a full deflection module. The plurality of configured rules determines the matched items by analyzing a plurality of historical results and the relevant items selected by the user from the historical results.

In an aspect, the relevance algorithm evaluates the selected relevant items based on one or more key phrases present in the search request, wherein the relevance algorithm assigns a higher relevancy score to the relevant items selected frequently by the user.

In an aspect, the configured rules and configuration are defined by using a setup page that allows an administrator to specify a rule for matching the relevant items.

In an aspect, the relevant items are integrated with a corresponding clickable link indicative to source information.

In an aspect, the relevant items comprise a plurality of website pages, a plurality of online documents, a plurality of articles, a plurality of images, a plurality of videos, a plurality of social media repositories, and a plurality of publications.

An aspect of the present disclosure relates to a device in a network. The device includes a non-transitory storage device having embodied therein one or more routines operable to match a search request and data to retrieve one or more relevant items from the data, and further assigning a relevancy score to the relevant items. The one or more routines include a matching module, a relevancy module, an inline deflection module, and a full deflection module.

The matching module is configured to receive at least one search request from a user and matches the search request against the data stored in a plurality of repositories. The matching module utilizes a plurality of instructions to retrieve the relevant items. The relevancy module is configured to compute and assign a relevancy score to the relevant items by utilizing a plurality of mechanisms. The plurality of mechanism comprises an inline deflection module and a full deflection module. The inline deflection module is configured for retrieving the data based on the relevancy score and performing a search after each word is typed in an entry field by the user to provide one or more relevant items with the highest relevancy score. The full deflection module is configured for performing a search across the repositories on detecting the search request entered in the entry field to display a plurality of matched items based on a plurality of configured rules used by a relevance algorithm. The plurality of configured rules determines the matched items on analyzing a plurality of historical results and the relevant items selected by the user from the historical results.

An aspect of the present disclosure relates to a system for matching a search request and data to retrieve one or more relevant items from the data, and further assigning a relevancy score to the relevant items. The system includes a processor and a memory. The memory stores machine-readable instructions that when executed by the processor cause the processor to receive at least one search request from a user and matches the search request against the data stored in a plurality of repositories through a matching module. The matching module utilizes a plurality of instructions to retrieve the relevant items. The processor is further configured to compute and assign a relevancy score to the relevant items through a relevancy module by utilizing a plurality of mechanisms. The plurality of mechanism retrieve the data based on the relevancy score and performing a search after each word is typed in an entry field by the user to provide one or more relevant items with highest relevancy score through an inline deflection module. Further, the mechanism performs a search across the repositories on detecting the search request entered in the entry field to display a plurality of matched items based on a plurality of configured rules used by a relevance algorithm configured with a full deflection module. The plurality of configured rules determines the matched items on analyzing a plurality of historical results and the relevant items selected by the user from the historical results.

Accordingly, one advantage of the present invention is that it provides a method for handling requests for data or information that are received by organizations, preferably a government organization.

Accordingly, one advantage of the present invention is that it provides an integrated platform that automatically identifies the existing matches and assigns relevancy scores to the matches based on the contextual proximity of the results matching with the request.

Accordingly, one advantage of the present invention is that it adapts or "learns" based on the available data sources to provide a better potential match to the search request.

Other features of embodiments of the present disclosure will be apparent from accompanying drawings and from the detailed description that follows.

Yet other objects and advantages of the present invention will become readily apparent to those skilled in the art following the detailed description, wherein the preferred embodiments of the invention are shown and described, simply by way of illustration of the best mode contemplated herein for carrying out the invention. As we realized, the invention is capable of other and different embodiments, and its several details are capable of modifications in various obvious respects, all without departing from the invention. Accordingly, the drawings and description thereof are to be regarded as illustrative in nature, and not as restrictive.

BRIEF DESCRIPTION OF THE DRAWINGS

In the figures, similar components and/or features may have the same reference label. Further, various components of the same type may be distinguished by following the reference label with a second label that distinguishes among the similar components. If only the first reference label is used in the specification, the description applies to any one of the similar components having the same first reference label irrespective of the second reference label.

DETAILED DESCRIPTION OF THE ILLUSTRATIVE EMBODIMENTS

The present disclosure is best understood with reference to the detailed figures and description set forth herein. Various embodiments have been discussed with reference to the figures. However, those skilled in the art will readily appreciate that the detailed descriptions provided herein with respect to the figures are merely for explanatory purposes, as the methods and systems may extend beyond the described embodiments. For instance, the teachings presented and the needs of a particular application may yield multiple alternative and suitable approaches to implement the functionality of any detail described herein. Therefore, any approach may extend beyond certain implementation choices in the following embodiments.

Systems and methods are disclosed for matching a search request and data to retrieve one or more relevant items from the data, and further assigning a relevancy score to the relevant items. Embodiments of the present disclosure include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, firmware, and/or by human operators.

Embodiments of the present disclosure may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present disclosure with appropriate standard computer hardware to execute the code contained therein. An apparatus for practicing various embodiments of the present disclosure may involve one or more computers (or one or more processors within a single computer) and storage systems containing or having network access to computer program(s) coded in accordance with various methods described herein, and the method steps of the disclosure could be accomplished by modules, routines, subroutines, or subparts of a computer program product.

The present invention discloses a system and method whereby a framework is created to match a search request and data to retrieve one or more relevant items from the data and assign a relevancy score to the relevant items. The present invention can be implemented as a software application (preferably a web software) to automatically produce matching information (documents, files, etc.) by applying certain rules against existing public records requests, knowledge base articles, website content, published open data, and social media repositories. The present invention processes the results in fewer requests and more importantly, fewer redundant requests.

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular name.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail to avoid obscuring the embodiments.

The term "machine-readable storage medium" or "computer-readable storage medium" includes, but is not limited to, portable or non-portable storage devices, optical storage devices, and various other mediums capable of storing, containing, or carrying instruction(s) and/or data. A machine-readable medium may include a non-transitory medium in which data can be stored, and that does not include carrier waves and/or transitory electronic signals propagating wirelessly or over wired connections. Examples of a non-transitory medium may include but are not limited to, a magnetic disk or tape, optical storage media such as compact disk (CD) or versatile digital disk (DVD), flash memory, memory or memory devices.

Although the present subject matter is explained considering that the present system is implemented on a server, it may be understood that the present system may also be implemented in a variety of computing systems, such as a laptop computer, a desktop computer, a notebook, a workstation, a mainframe computer, a server, Amazon elastic compute cloud (Amazon EC2), Microsoft Azure, a network server, and the like. It will be understood that multiple users may access the present system through one or more computing devices. Examples of the computing devices may include but are not limited to, a portable computer, a personal digital assistant, a handheld or mobile device, smart devices, and a workstation. The computing devices are communicatively accessible to the present system through a network.

In one implementation, the network may be a wireless network, a wired network or a combination thereof. The network can be implemented as one of the different types of networks, such as an intranet, local area network (LAN), wide area network (WAN), the internet, and the like. The network may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further, the network 106 may include a variety of network devices, including routers, bridges, servers, computing devices, storage devices, and the like.

Figure 1:
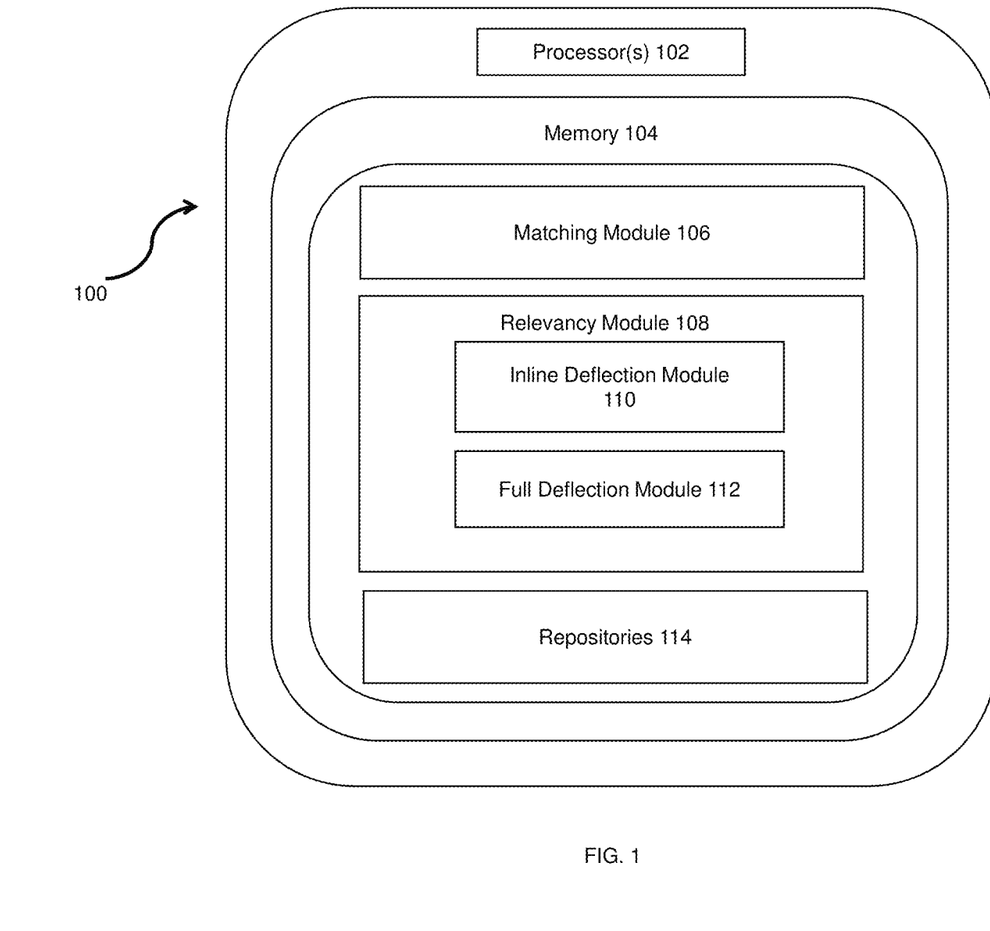
FIG. 1 illustrates a block diagram of the present system for matching a search request and data to retrieve one or more relevant items from the data, and further assigning a relevancy score to the relevant items, in accordance with an embodiment of the present invention.

FIG. 1 illustrates a block diagram of the present system 100 for matching a search request and data to retrieve one or more relevant items from the data, and further assigning a relevancy score to the relevant items, in accordance with an embodiment of the present invention. The system 100 includes a processor 102 and a memory 104. The memory 104 stores machine-readable instructions that when executed by the processor 102 cause the processor 102 to receive at least one search request from a user and matches the search request against the data stored in a plurality of repositories 114 through a matching module 106. The matching module 106 utilizes a plurality of instructions to retrieve the relevant items. The processor 102 is further configured to compute and assign a relevancy score to the relevant items through a relevancy module by utilizing a plurality of mechanisms. In an embodiment, the relevant items are integrated with a corresponding clickable link indicative to source information.

The plurality of mechanisms retrieve the data based on the relevancy score and performing a search after each word is typed in an entry field 202 (shown in FIGS. 2 and 3) by the user to provide one or more relevant items with highest relevancy score through an inline deflection module 110.

Figure 2:
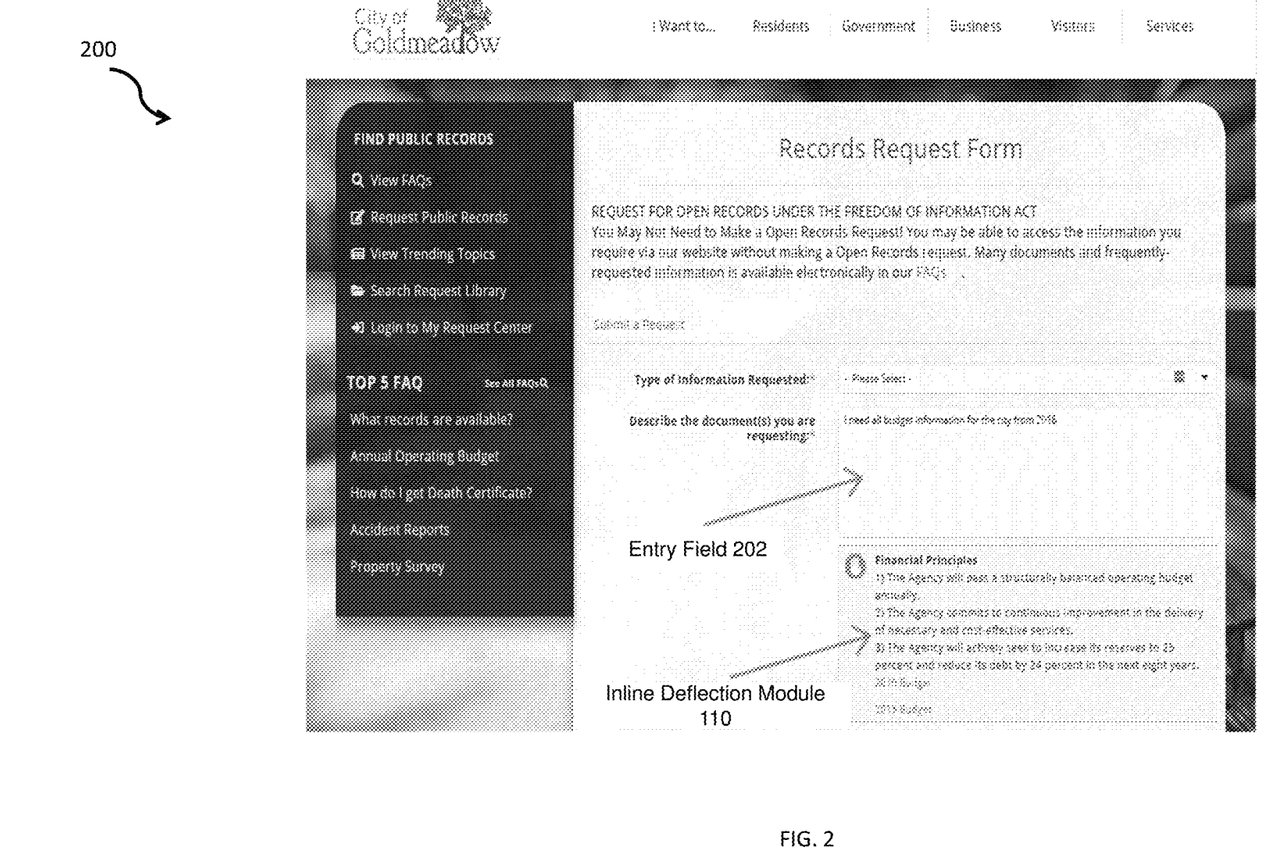
FIG. 2 illustrates an exemplary operational screenshot of the inline deflection module, in accordance with an embodiment of the present invention.

FIG. 2 illustrates an exemplary operational screenshot 200 of the inline deflection module, in accordance with an embodiment of the present invention. This includes a field for the type of information being requested, and an entry field 202 in which the data can be entered. The inline deflection module 110 provides the results of the request.

Figure 3:
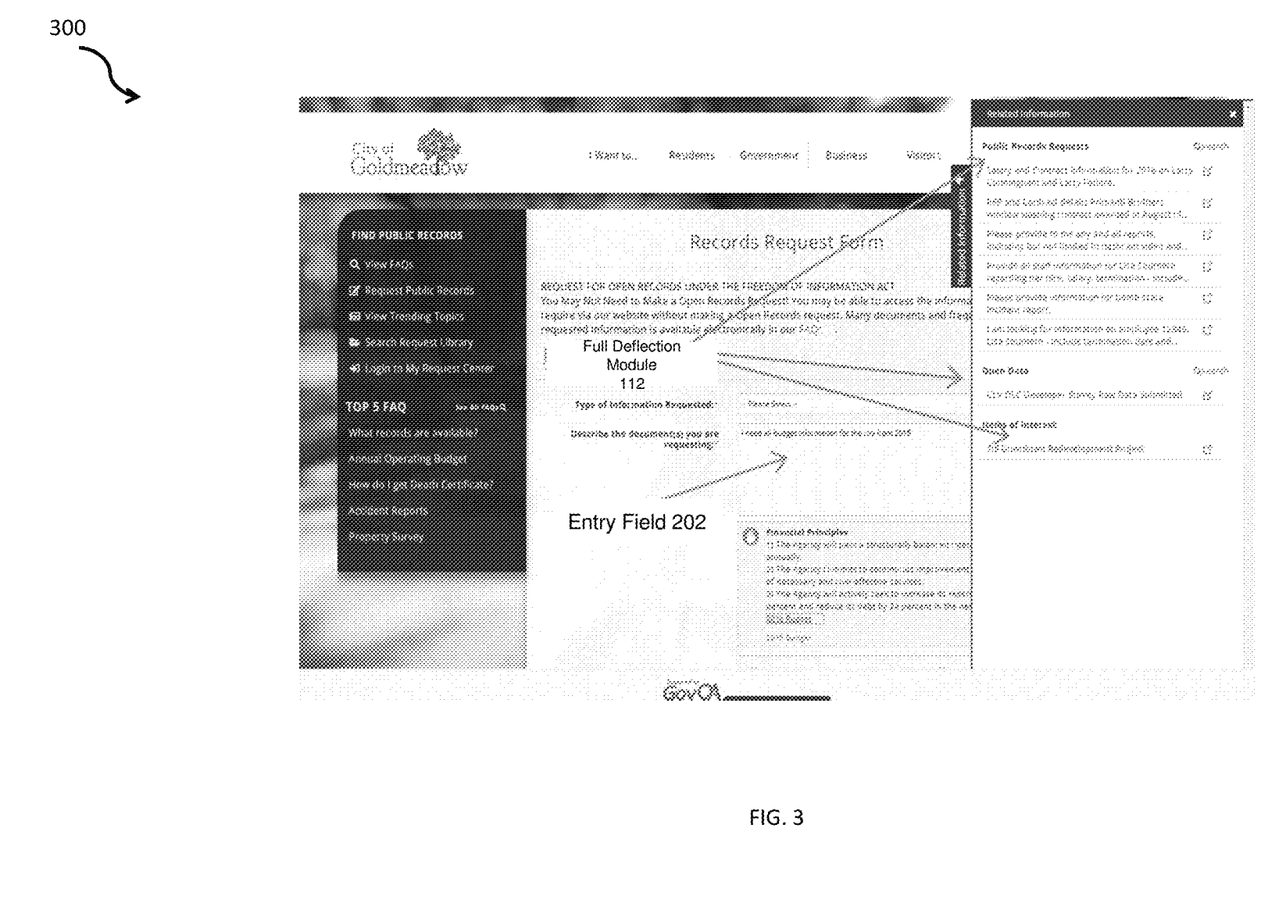
FIG. 3 illustrates an exemplary operational screenshot of the full deflection module, in accordance with an embodiment of the present invention.

Further, the mechanism performs a search across the repositories 114 on detecting the search request entered in the entry field 202 to display a plurality of matched items based on a plurality of configured rules used by a relevance algorithm configured with a full deflection module 112. FIG. 3 illustrates an exemplary operational screenshot 300 of the full deflection module, in accordance with an embodiment of the present invention. In an embodiment, the relevance algorithm evaluates the selected relevant items based on one or more key phrases present in the search request. The relevance algorithm assigns a higher relevancy score to the relevant items selected frequently by the user.

The plurality of configured rules determines the matched items on analyzing a plurality of historical results and the relevant items selected by the user from the historical results. In an embodiment, the configured rules and configuration are defined by using a setup page that allows an administrator to specify a rule for matching the relevant items. In an embodiment, the relevant items comprise a plurality of website pages, a plurality of online documents, a plurality of articles, a plurality of images, a plurality of videos, a plurality of social media repositories, and a plurality of publications.

In operation, the relevance algorithm analyzes the items which are selected based on the entered key phrases. If the items are selected more often, they are forced to the top of the list. The rules and configuration are defined using a setup screen that allows the administrator to specify the exact method for matching items.

Figure 4:
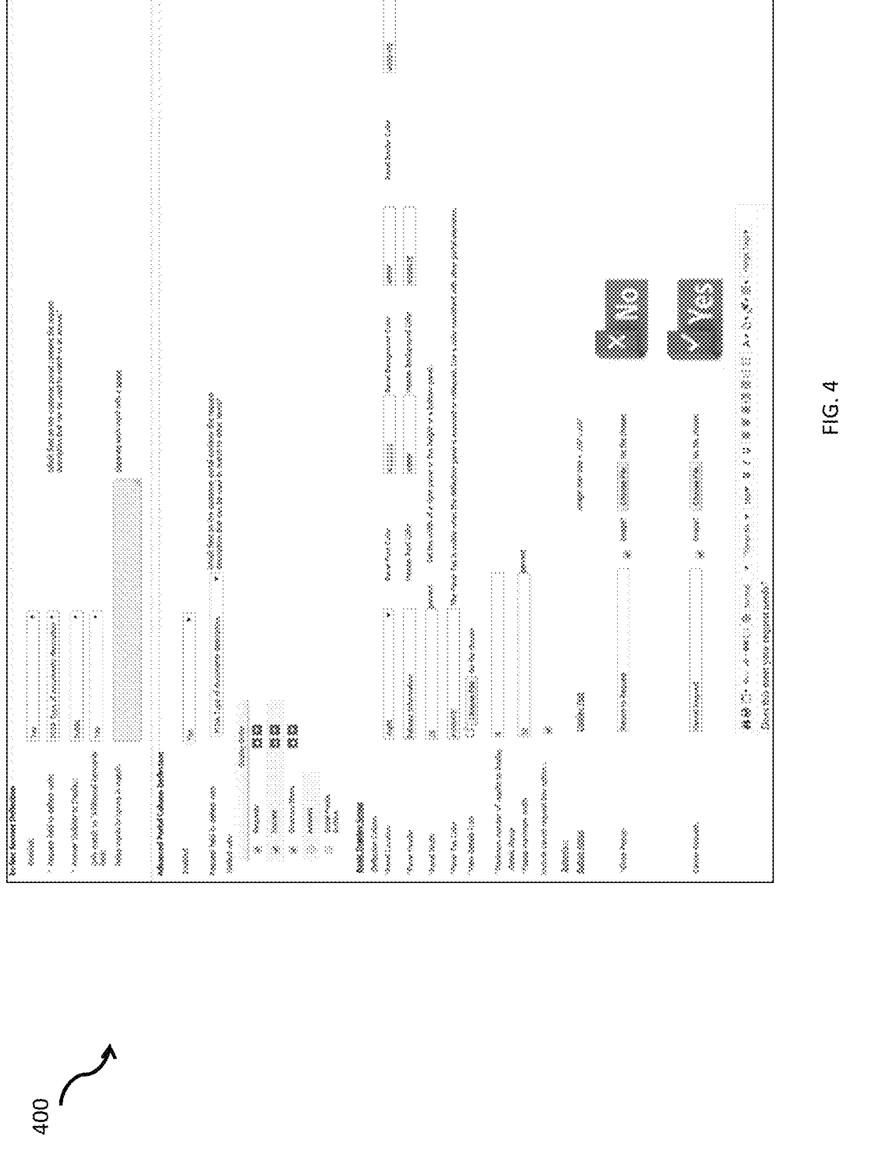
FIG. 4 illustrates an exemplary operational screenshot of the setup screen, in accordance with an embodiment of the present invention.

FIG. 4 illustrates an exemplary operational screenshot 400 of the setup screen, in accordance with an embodiment of the present invention. Furthermore, for the knowledge base repository, they can add additional keywords that will force that specific item to appear in the list. The options depicted in FIG. 4 allows the administrator to specify many options such as the order, the types of matches, the location, the icons, number of results, look, and feel of the text, and other parameters.

Figure 5:
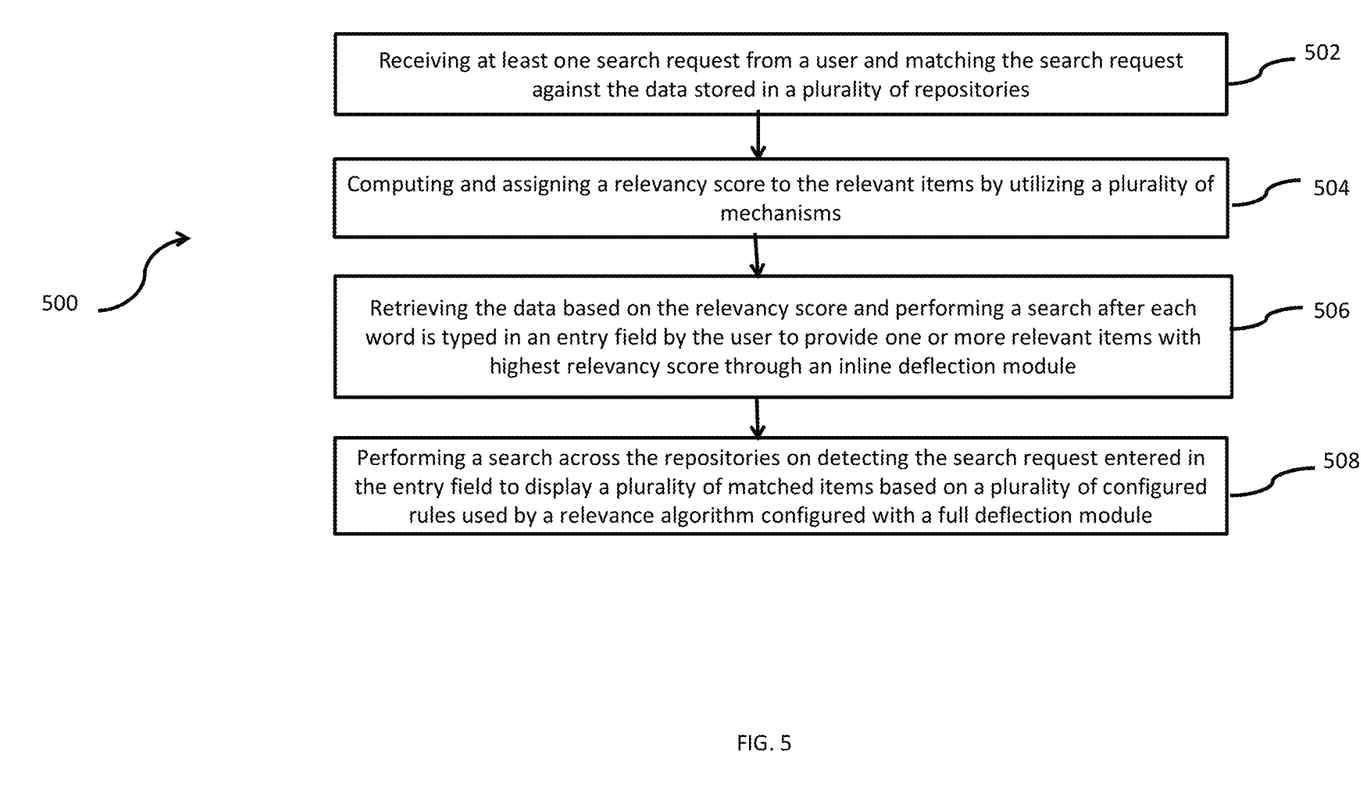
FIG. 5 illustrates a flowchart of the method for matching a search request and data to retrieve one or more relevant items from the data, and further assigning a relevancy score to the relevant items, in accordance with an embodiment of the present invention.

FIG. 5 illustrates a flowchart 500 of the method for matching a search request and data to retrieve one or more relevant items from the data, and further assigning a relevancy score to the relevant items, in accordance with an embodiment of the present invention. The method comprises a step 502 of receiving at least one search request from a user and matching the search request against the data stored in a plurality of repositories. The matching module utilizes a plurality of instructions to retrieve the relevant items. The method includes a step 504 of computing and assigning a relevancy score to the relevant items by utilizing a plurality of mechanisms. The plurality of mechanisms perform a step 506 of retrieving the data based on the relevancy score and performing a search after each word is typed in an entry field by the user to provide one or more relevant items with highest relevancy score through an inline deflection module. Then the mechanism performs 508 a search across the repositories on detecting the search request entered in the entry field to display a plurality of matched items based on a plurality of configured rules used by a relevance algorithm configured with a full deflection module. The plurality of configured rules determines the matched items on analyzing a plurality of historical results and the relevant items selected by the user from the historical results.

Thus the present system and method provide an efficient, simpler and more elegant framework/platform to handle search requests for information that are received by (typically) government organizations. The present system automatically identifies existing matches and assigns relevancy scores based on how closely the results match the request. The present system adapts or "learns" based on the available data sources to provide a better potential match to the search request.

While embodiments of the present disclosure have been illustrated and described, it will be clear that the disclosure is not limited to these embodiments only. Numerous modifications, changes, variations, substitutions, and equivalents will be apparent to those skilled in the art, without departing from the scope of the disclosure, as described in the claims.

What is claimed is:

1. A computer-implemented method for matching a search request and data to retrieve one or more relevant items from the data, and further assigning a relevancy score to the relevant items, the method comprising steps of:
   receiving, by one or more processors, at least one search request from a user, and
   matching the search request against the data stored in a plurality of repositories,
   wherein the one or more processors utilizes a plurality of instructions to retrieve the relevant items; and
   computing and assigning, by one or more processors, a relevancy score to the relevant items by utilizing a plurality of mechanisms including at least:
   using an inline deflection module running on the one or more processors, to analyze the data based on the relevancy score and
   performing a search after each word is typed in an entry field by the user to provide one or more relevant items with highest relevancy score using the inline deflection module and without accessing the repositories; and
   detecting the search request entered in the entry field being completed, and
   performing, by the one or more processors, a search across the repositories to display a plurality of matched items based on a plurality of configured rules used by a relevance algorithm configured with a full deflection module,
   wherein the plurality of configured rules determines the matched items by techniques including a plurality of historical results and the relevant items selected by the user from the historical results.

2. The method according to claim 1, wherein the relevance algorithm determines one or more key phrases present in the search request, and evaluates the selected relevant items based on the one or more key phrases present in the search request, wherein the relevance algorithm assigns a higher relevancy score to the relevant items selected more frequently by the user.

3. The method according to claim 1, wherein the configured rules and configuration are defined by using a setup page that allows an administrator to specify a rule for matching the relevant items and where the setup page includes a first set of rules for the inline deflection module, and a second set of rules for the full deflection module.

4. The method according to claim 1, wherein the relevant items are integrated with a corresponding clickable link indicative to source information.

5. The method according to claim 1, wherein the relevant items comprise a plurality of website pages, a plurality of online documents, a plurality of articles, a plurality of images, a plurality of videos, a plurality of social media repositories, and a plurality of publications.

6. A system for matching a search request and data to retrieve one or more relevant items from the data, and further assigning a relevancy score to the relevant items, the system comprising:
   a processor; and
   a memory to store machine-readable instructions that when executed by the processor cause the processor to:
   receive at least one search request from a user and match the search request against the data stored in a plurality of repositories through a matching module,
   wherein the matching module utilizes a plurality of instructions to retrieve the relevant items; and compute and assign a relevancy score to the relevant items through a relevancy module by utilizing a plurality of mechanisms including at least:

using an inline deflection module for retrieving the data based on the relevancy score and performing a search after each word is typed in an entry field by the user to provide one or more relevant items with highest relevancy score, the inline deflection module operating using the inline deflection module and without accessing the repositories; and performing a search across the repositories on detecting the search request entered in the entry field being completed, to display a plurality of matched items based on a plurality of configured rules used by a relevance algorithm configured with a full deflection module, wherein the plurality of configured rules determines the matched items by techniques including a plurality of historical results and the relevant items selected by the user from the historical results.

7. The system according to claim 6, wherein the relevance algorithm determines one or more key phrases present in the search request, and evaluates the selected relevant items based on one or more key phrases present in the search request, wherein the relevance algorithm assigns a higher relevancy score to the relevant items selected frequently by the user.

8. The system according to claim 6, wherein the configured rules and configuration are defined by using a setup page that allows an administrator to specify a rule for matching the relevant items and where the setup page includes a first set of rules for the inline deflection module, and a second set of rules for the full deflection module.

9. The system according to claim 6, wherein the relevant items are integrated with a corresponding clickable link indicative to source information.

10. The system according to claim 6, wherein the relevant items comprises a plurality of website pages, a plurality of online documents, a plurality of articles, a plurality of images, a plurality of videos, a plurality of social media repositories, and a plurality of publications.

11. A device in a network, comprising:
a non-transitory storage device having embodied therein one or more routines operable to match a search request and data to retrieve one or more relevant items from the data, and further assigning a relevancy score to the relevant items; and
one or more processors coupled to the non-transitory storage device and operable to execute the one or more routines, including at least:
a matching module to receive at least one search request from a user and matches the search request against the data stored in a plurality of repositories,
wherein the matching module utilizes a plurality of instructions to retrieve the relevant items; and
a relevancy module to compute and assign a relevancy score to the relevant items by utilizing a plurality of mechanisms selected from at least one of:
an inline deflection module for retrieving the data based on the relevancy score and performing a search after each word is typed in an entry field by the user to provide one or more relevant items with highest relevancy score using the inline deflection module and without accessing the repositories; and
a full deflection module for performing a search across the repositories on detecting the search request entered in the entry field being completed,
to display a plurality of matched items based on a plurality of configured rules used by a relevance algorithm configured with a full deflection module,
wherein the plurality of configured rules determines the matched items by techniques including a plurality of historical results and the relevant items selected by the user from the historical results.

12. The device according to claim 11, wherein the relevance algorithm determines one or more key phrases present in the search request, and evaluates the selected relevant items based on the one or more key phrases present in the search request, wherein the relevance algorithm assigns a higher relevancy score to the relevant items selected frequently by the user.

13. The device according to claim 11, wherein the configured rules and configuration are defined by using a setup page that allows an administrator to specify a rule for matching the relevant items and where the setup page includes a first set of rules for the inline deflection module, and a second set of rules for the full deflection module.

14. The device according to claim 11, wherein the relevant items are integrated with a corresponding clickable link indicative to source information.

15. The device according to claim 11, wherein the relevant items comprises a plurality of website pages, a plurality of online documents, a plurality of articles, a plurality of images, a plurality of videos, a plurality of social media repositories, and a plurality of publications.

* * * * *